United States Patent
Digne et al.

(10) Patent No.: US 9,352,272 B2
(45) Date of Patent: May 31, 2016

(54) PROCESS FOR CATALYTIC CRACKING ASSOCIATED WITH AN AMINE TREATMENT UNIT WITH IMPROVED $CO_2$ BALANCE

(71) Applicant: IFP ENERGIES NOUVELLES, Rueil-Malmaison (FR)

(72) Inventors: Romina Digne, Lyons (FR); Frederic Feugnet, Lyons (FR); Mai Phuong Do, Courbevoie (FR)

(73) Assignee: IFP Energies nouvelles, Rueil Malmaison (FR)

( * ) Notice: Subject to any disclaimer, the term of this patent is extended or adjusted under 35 U.S.C. 154(b) by 155 days.

(21) Appl. No.: 13/719,302

(22) Filed: Dec. 19, 2012

(65) Prior Publication Data

US 2013/0152791 A1 Jun. 20, 2013

(30) Foreign Application Priority Data

Dec. 20, 2011 (FR) ..................... 11 03999

(51) Int. Cl.
  *B01D 53/14* (2006.01)
  *C10G 11/18* (2006.01)
  (Continued)

(52) U.S. Cl.
  CPC ........ *B01D 53/1475* (2013.01); *B01D 53/1425* (2013.01); *C10G 11/182* (2013.01); *C10G 11/185* (2013.01); *C10K 1/005* (2013.01); *C10K 1/143* (2013.01); *F01K 7/38* (2013.01); *F01K 23/064* (2013.01); *F01K 27/02* (2013.01);
  (Continued)

(58) Field of Classification Search
  CPC ........... B01D 2259/65; B01D 53/1425; B01D 53/1475; C10G 11/18; C10G 11/182; C10G 11/185; C10G 2300/4043; C10K 1/005; C10K 1/143; F01K 23/064; F01K 27/02; F01K 7/38; F22B 37/008; G06Q 30/06; Y02C 10/04; Y02C 10/06
  See application file for complete search history.

(56) References Cited

U.S. PATENT DOCUMENTS 4,143,521 A * 3/1979 Pano ................. B01J 19/0006
                                                    585/634
4,716,737 A * 1/1988 Mandrin ................. F01K 17/04
                                                    60/651
(Continued)

FOREIGN PATENT DOCUMENTS

EP       0 369 537 A1    5/1990
FR       2 939 693 A1    6/2010
(Continued)

OTHER PUBLICATIONS

Jessica Stillman, "What is Carbon Credit", May 1, 2008, CBSN CBS News, pp. 1-5.*

(Continued)

*Primary Examiner* — Duane Smith
*Assistant Examiner* — Cabrena Holecek
(74) *Attorney, Agent, or Firm* — Millen, White, Zelano & Branigan, P.C.

(57) ABSTRACT

The present invention describes a process for catalytic cracking associated with a unit for amine treatment of regeneration fumes from the catalytic cracking unit, which process uses at least one counter-pressure turbine to operate the cracked gas compressor and/or the regenerative air blower which can be used to improve the $CO_2$ balance by delivering a $CO_2$ credit.

8 Claims, 2 Drawing Sheets

(51) Int. Cl.
*F01K 23/06* (2006.01)
*G06Q 30/06* (2012.01)
*C10K 1/00* (2006.01)
*C10K 1/14* (2006.01)
*F01K 7/38* (2006.01)
*F01K 27/02* (2006.01)
*F22B 37/00* (2006.01)

(52) U.S. Cl.
CPC ............. *F22B37/008* (2013.01); *G06Q 30/06* (2013.01); *B01D 2259/65* (2013.01); *C10G 2300/4043* (2013.01); *Y02C 10/04* (2013.01); *Y02C 10/06* (2013.01); *Y02P 20/131* (2015.11); *Y02P 20/152* (2015.11); *Y02P 20/584* (2015.11); *Y02P 30/446* (2015.11)

(56) References Cited

U.S. PATENT DOCUMENTS 4,904,372 A 2/1990 Goelzer

| | | | |
|---|---|---|---|
| 2010/0239475 A1* | 9/2010 | Liu et al. | 422/198 |
| 2010/0243528 A1* | 9/2010 | Bell et al. | 208/113 |
| 2011/0272326 A1* | 11/2011 | Feugnet et al. | 208/113 |
| 2012/0014853 A1* | 1/2012 | Feugnet et al. | 423/229 |
| 2012/0204817 A1* | 8/2012 | Scherffius | 122/7 R |

FOREIGN PATENT DOCUMENTS

WO WO 2010070212 A1 * 6/2010
WO WO 2011/073671 A1 6/2011

OTHER PUBLICATIONS

Department of Energy, "Carbon Dioxide Capture from Existing Coal-Fired Power Plants", Nov. 2007, Appendix IV.*

F. Carl Knopf; "Modeling, Analysis and Optimization of Process and Energy Systems"; 2012; John Wiley & Sons, Inc.; Chapter 1, example 1.2.*

Search Report of FR 1103999 (Oct. 4, 2012).

* cited by examiner

PROCESS FOR CATALYTIC CRACKING ASSOCIATED WITH AN AMINE TREATMENT UNIT WITH IMPROVED $CO_2$ BALANCE

FIELD OF THE INVENTION

The present invention relates to the field of the capture of carbon dioxide ($CO_2$) emitted by fumes originating from regeneration in catalytic cracking units (abbreviated to FCC).

The capture of $CO_2$ is an essential aspect in the battle against the greenhouse effect, since $CO_2$ is one of the principal culprits. In order to limit the phenomenon of climate warming, the carbon dioxide is extracted from combustion fumes with a view to being sequestrated in an underground reservoir. Most carbon dioxide waste comes from industrial activity, i.e. on average 60% globally, of which 40% comes from fumes from power stations for the production of electricity.

In refineries, the fluid catalytic cracking (FCC) unit may be considered as one of the highest $CO_2$ emitters with almost 20% of emissions from it alone; the other sources are in the various reheating or distillation furnaces. When reducing $CO_2$ emissions from a refinery, then, it is clear that FCC constitutes a prime target.

The present invention proposes a solution that calls upon known capture technology, termed amine capture, but develops a utilities balance which is greatly in surplus in terms of HP steam (high pressure) and LP steam (low pressure) from the integrated FCC/amine capture unit process by means of a judicious choice of the drives for the two compressors of the process and of intense energy recovery. Thus, an integrated FCC/amine capture unit process is obtained with very low or even negative $CO_2$ emissions. This is then known as a process with a $CO_2$ credit.

EXAMINATION OF THE PRIOR ART

The prior art describes an integrated FCC/amine treatment unit process in which all or a portion of the regeneration fumes are sent to the amine treatment unit. The catalytic cracking unit is equipped with an external exchanger using a portion of the catalyst removed from the regeneration zone as the hot fluid and the heat required for the amine treatment unit is integrally provided by the steam generated by said external exchanger. In the prior art, the quantity of steam generated in the process is insufficient to treat all of the FCC fumes.

Thus, patent FR 2 939 693 describes an integrated process for the capture of $CO_2$ emitted by at least a portion of the fumes exiting from the regeneration zone of a catalytic cracking unit (denoted FCC), using a unit for the amine treatment (denoted AMN) of said fumes, in which the catalytic cracking unit is equipped with an external exchanger using a portion of the catalyst removed from the regeneration zone as the hot fluid, the heat necessary to regenerate the amine in the amine treatment unit being integrally provided by the catalytic cracking unit by using the steam generated by said external exchanger.

In the context of the present invention, this external exchanger will be denoted (CCE).

BRIEF DESCRIPTION OF THE INVENTION

Figure 1:
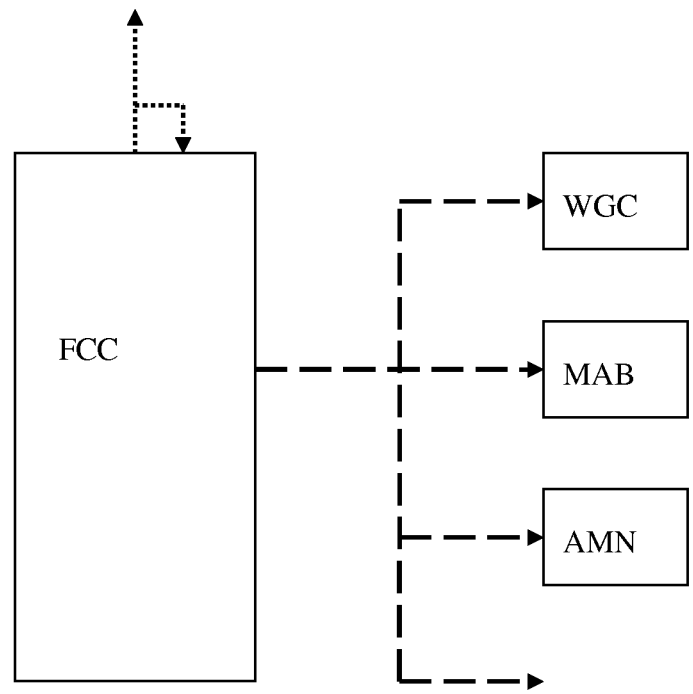
FIG. 1, in accordance with the prior art, is a layout for the use of HP steam generated by the FCC unit and shows 3 principal uses:
 a) for the turbine causing the cracked gas compressor to turn (WGC);
 b) for the turbine causing the regenerative air blower (MAB) to turn; and
 c) to regenerate the amine from the amine treatment unit (AMN). In the prior art, the surplus steam is almost zero. The turbines used in the prior art are fully condensing turbines.
Figure 2:
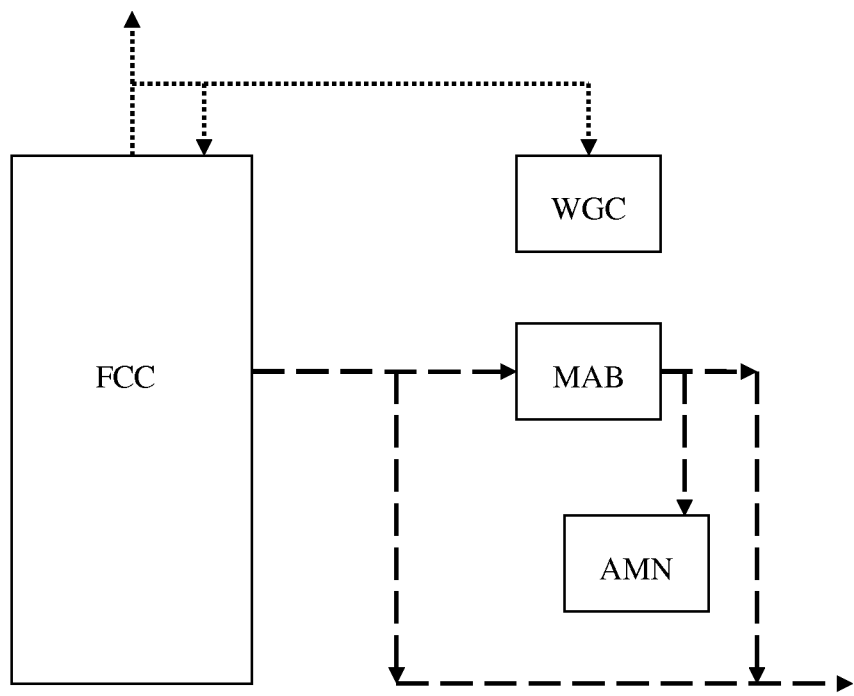
FIG. 2, in accordance with the invention, is a layout for using HP steam generated by the FCC unit which reiterates its application b) to the turbine causing the regenerative air blower (MAB) to turn, the turbine being, in accordance with the invention, a counter-pressure turbine which can be used to deliver a flow of LP steam which carries out regeneration of the amine from the amine treatment unit (AMN). In this case, in accordance with the invention, the cracked gas compressor (WGC) is caused to move by means of an electric motor.
Figure 3:
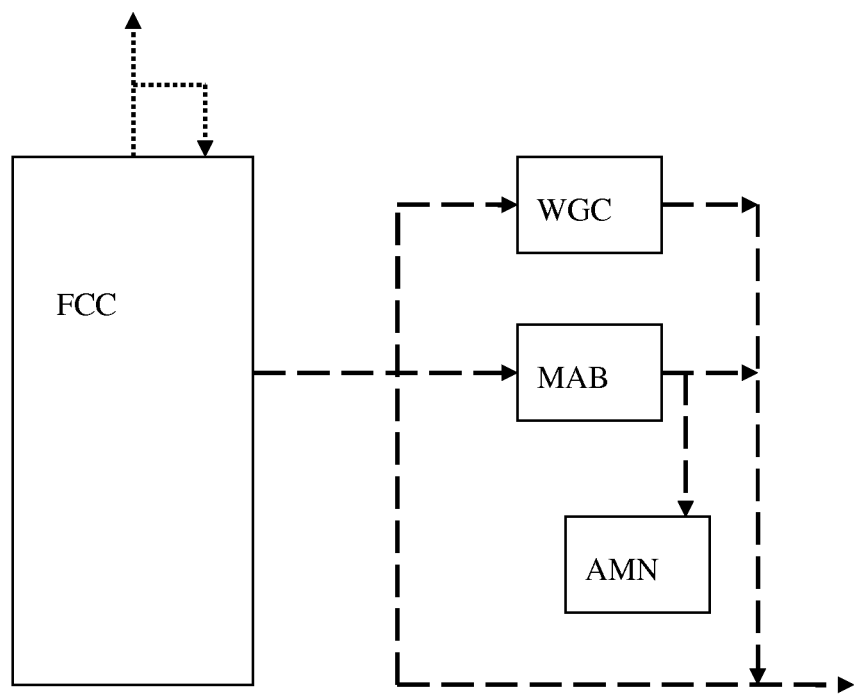
FIG. 3, in accordance with the invention, represents the layout for using HP steam generated by the catalytic cracking unit in the variation in which said HP steam is used:
 a) for the turbine causing the cracked gas compressor to turn (WGC);
 b) for the turbine causing the regenerative air blower (MAB) to turn; the two turbines being counter-pressure turbines, which means that a flow of LP steam can be released which, as in the preceding case, carries out regeneration of the amine from the amine treatment unit (AMN).

The present invention can be defined as an integrated process for the capture of $CO_2$ emitted by fumes exiting from the regeneration zone of a catalytic cracking (FCC) unit treating a vacuum distillate or atmospheric residue type hydrocarbon cut, using a unit for the amine treatment (AMN) of said fumes to eliminate $CO_2$ therefrom, in which process the HP steam principally produced by cooling regeneration fumes is used to provide either the drive for the regenerative air blower (MAB) of the FCC unit by means of a first counter-pressure turbine, or the drive for the cracked gas compressor (WGC) by means of a second counter-pressure turbine, the resulting LP steam being used to carry out regeneration of the amine in the amine treatment unit (AMN), and the surplus HP and LP steam being converted into a $CO_2$ credit.

In certain cases in relation to the coke production potential of the feed (measured by the concept of Conradson Carbon), the FCC unit is equipped with an external exchanger (CCE), the HP steam principally produced by cooling the regeneration fumes is used to provide either the drive for the regenerative air blower (MAB) of the FCC unit by means of a first counter-pressure turbine or the drive for the cracked gas compressor (WGC) by means of a second counter-pressure turbine, the resulting LP steam being used to carry out regeneration of the amine in the amine treatment unit (AMN), and the surplus HP and LP steam being converted into a $CO_2$ credit.

The expression "either" should be construed in its broad sense, i.e. three configurations are possible in the context of the present invention:
 1) the HP steam is used to drive the regenerative air blower by means of a counter-pressure turbine, and the cracked gas compressor is driven by an electric motor;
 2) the HP steam is used to drive the cracked gas compressor by means of a counter-pressure turbine and the regenerative air blower is driven by an electric motor;
 3) the HP steam is used to drive the regenerative air blower by means of a first counter-pressure turbine and to drive the cracked gas compressor by means of a second counter-pressure turbine.

In the third variation of the integrated process for the capture of $CO_2$ emitted by the fumes exiting from the regeneration zone of a catalytic cracking unit (FCC) of the invention, the HP steam principally generated by cooling the regeneration fumes is used on the one hand to drive the regenerative air blower (MAB) by means of a first counter-pressure turbine, and on the other hand to drive the cracked gas compressor (WGC) by means of a second counter-pressure turbine, the surplus HP and LP steam being converted into a $CO_2$ credit.

Compared with the closest prior art described in patent FR 2 939 693, the integrated process of the present invention which is an improvement thereto can be used to deliver a far larger $CO_2$ credit, as will be demonstrated in the examples below.

When the FCC unit is provided with an expansion turbine (also known as an expander) operating on the regeneration fumes and allowing the production of electricity, the $CO_2$ credit is increased still further.

In the present invention, the integrated process for the capture of $CO_2$ emitted by the fumes exiting from the regeneration zone of a FCC unit thus uses a catalytic cracking unit preferably operating under high severity conditions, i.e.:
 for a unit with a riser reactor, a C/O ratio in the range 2 to 20, preferably in the range 4 to 15, and with a reactor outlet temperature in the range 450° C. to 650° C., preferably in the range 470° C. to 620° C.;
 for a unit with a downer reactor, a C/O ratio in the range 10 to 50, preferably in the range 10 to 30, and a reactor outlet temperature in the range 480° C. to 650° C., preferably in the range 520° C. to 620° C.

The integrated process for the capture of $CO_2$ emitted by the fumes exiting from the regeneration zone of a catalytic cracking (FCC) unit of the present invention employs an amine treatment unit which uses an amine selected from the following group: MEA (monoethanolamine), DEA (diethanolamine), MDEA (dimethylethanolamine), DIPA (diisopropylamine), DGA (diglycolamine), diamines, piperazine, and hydroxyethyl piperazine. Preferably, the amine is selected from the sub-group: MEA (monoethanolamine), DEA (diethanolamine), and MDEA (dimethylethanolamine.

More preferably, the amine treatment unit uses MEA (monoethanolamine). A further preferred alternative is the use of tetramethylhexane-1,6-diamine, generally known as TMHDA.

DETAILED DESCRIPTION OF THE INVENTION

The present invention can thus be considered to be an improvement to the integrated FCC/treatment of regeneration fumes by an amine unit process described in patent FR 2 939 693 in the sense that the integrated FCC/amine unit process of the present invention still produces surplus steam and/or electricity, while having treated all of the fumes from the FCC unit in the amine unit.

In the closest prior art (represented by the patent cited above), only a part of the regeneration fumes could be treated by the amine treatment unit, with a steam balance which was just sufficient to carry out regeneration of the amine.

In other words, the integrated FCC/amine unit of the present invention can be used to treat all of the regeneration fumes from the FCC unit, releasing surplus steam thereby, which will result in a $CO_2$ credit.

The integrated FCC/amine treatment unit requires a large quantity of electrical or thermal energy:
 to regenerate the amine after $CO_2$ absorption;
 to drive the air blower (MAB) which compresses the air necessary to regenerate the catalyst from atmospheric pressure up to the pressure of the regenerator or regenerators (2 to 5 bars absolute);
 to drive the cracked gas compressor (WGC), which compresses the gaseous effluent at the head of the principal fractionation column from approximately 1 to 2 bars absolute up to approximately 15 to 20 bars absolute (1 bar=$10^5$ Pascal);
 for injecting steam into the riser and for stripping said catalyst in the reaction zone.

The amine is generally regenerated by heating with the low pressure steam (denoted LP).

The two compressors of the FCC unit, i.e. the cracked gas compressor (WGC) and the regenerative air blower (MAB), may be driven by fully condensing turbines or electric motors. In the prior art, these two compressors are driven mechanically by fully condensing steam turbines.

The fully condensing turbines are generally supplied with high pressure steam and discharge the steam at a pressure which is below atmospheric pressure, the vacuum being produced by a condenser. At the outlet from the condenser, condensates are obtained at a temperature below approximately 50° C. When a fully condensing turbine is used, the enthalpy of vaporization of water is somehow "lost" in the condenser.

Turbines known as counter-pressure turbines also exist; they are generally supplied with high pressure steam and discharge medium pressure steam (MP) or low pressure steam (LP).

The MP or LP steam which escapes from the counter-pressure turbine may then re-heat or vaporize another fluid when the steam condenses. In contrast to a fully condensing turbine, the enthalpy of vaporization of water is not lost but is used to reheat or vaporize a fluid.

Finally, the two compressors mentioned above may also be driven by an electric motor. In the context of the present invention, the use of the available MP or LP is intended to be optimized, and at least one counter-pressure turbine is used to drive the cracked gas compressors (WGC) and/or to drive the regenerative air blower (MAB).

In the case in which only one counter-pressure turbine is used to drive one of the two compressors, the other compressor is driven by an electric motor.

The integrated FCC/amine treatment unit process can be used to produce HP steam and electrical energy in several manners:
 the production of steam at various pressures, but principally at high pressure by cooling the fumes originating from the regenerator(s) and the CO incinerator when one is present;
 the production of steam or hot water at the principal fractionation stage by means of circulating refluxes;
 the production of steam, usually HP steam, at the external exchanger (CCE), the heat being supplied by catalyst removed from one or more points of the regeneration zone of the FCC unit;
 the production of electricity at the expansion turbine, when this latter is employed, from fumes exiting from the first regeneration stage with a view to producing electricity. As will be seen below, this electricity production can be converted into a $CO_2$ credit.

The process of the present invention has a utilities balance, in particular LP steam, which is in great surplus thanks to a judicious choice of drives for the two compressors of the process and the presence of an expansion turbine.

The process of the invention uses a first counter-pressure turbine to drive the air blower (turbine supplied with HP steam and releasing LP steam), and in a preferred variation a second counter-pressure turbine to drive the cracked gas compressor (WGC).

Thus, an overall utilities balance (electricity and steam) is obtained for the integrated FCC/amine regeneration fume treatment unit which is in great surplus, which ultimately results in a $CO_2$ credit.

The choice of drive for the cracked gas compressor (counter-pressure turbine or electric motor) depends on the nature of the utilities which are to be in great surplus (high pressure or low pressure steam, for example).

The electricity generated by the expansion turbine is in fact generally more than the motor requires to drive the cracked gas compressor and more than the electrical consumption of the pumps and air condensers of the process.

Similarly, the steam generated by cooling the regeneration fumes, the external exchanger on the hot catalyst (denoted CCE) and the principal fractionation of the effluents is greater than the steam requirements for the process of the invention.

This is due to the fact that the HP steam sent to the counter-pressure turbine which drives the air blower (MAB) is transformed into LP steam, which can be used directly to regenerate the amine.

This transformation of HP steam into LP steam in order to regenerate the amine is further reinforced when a second counter-pressure turbine is used to drive the cracked gas compressor (WGC), which is the preferred variation of the present invention.

The surplus energy from the process of the invention associated with the capture of $CO_2$ from the FCC fumes with a view to being sequestrated results in a $CO_2$ balance for the integrated process which may be negative. This is called a $CO_2$ credit rather than $CO_2$ emission from the process.

The $CO_2$ balance of the integrated FCC/amine capture unit process may not only involve the $CO_2$ present in the fumes discharged into the atmosphere, but also the $CO_2$ resulting from the consumption or production of utilities, such as electricity or steam, in the process.

In fact, if the process requires electricity, then the $CO_2$ balance must include the emissions generated to produce that electricity, even if those emissions occur at another site.

In contrast, when the process produces surplus electricity, the surplus electricity is converted into a $CO_2$ credit.

Three greenhouse gases (GHG) are taken into account: $CO_2$, $CH_4$ and $N_2O$, which are the principal contributors to the intensification of the greenhouse effect, and which are the most pertinent for the systems being studied. The respective flows of these GHGs are aggregated into a $CO_2$ equivalent (reference gas for indicating the impact characterizing the contribution of a greenhouse system), expressed as the equivalent mass of $CO_2$ (hereinafter denoted $CO_2$ eq).

The conversion of each of these three gases into $CO_2$ eq is based on coefficients termed the global warming potential (GWP), giving the relative contribution to climate warming of the emission of 1 g of each of the greenhouse gases compared with the emission of 1 g of $CO_2$ over a predetermined period (the most usual time period used being 100 years).

The consumption (or production) of utilities is converted into $CO_2$ emission (or credit) using the concept of an emission factor which is explained below.

As an example, an emission factor of 100 g $CO_2$ eq/MJ for electricity means that the production of 1 MJ of electricity results in the emission of 100 g of $CO_2$ eq.

It is important to note that these coefficients are representative of a geographical and temporal context and they may vary significantly as a function of the geographical zone or the date under consideration (because of the modes of production or different transport distances or the change in technologies over the period under consideration).

The comparative example below will provide a better understanding of these concepts.

COMPARATIVE EXAMPLE

In this example, we shall consider a unit for catalytic cracking (FCC) of a hydrotreated atmospheric residue associated with a unit for the amine treatment of regeneration fumes exiting from FCC intended to capture $CO_2$.

The example is comparative in that it compares the utilities balance (steam and electricity) of the integrated prior art process as described in patent FR 2 939 693, and the integrated process of the present invention.

Next, this utilities balance is translated into $CO_2$ credit using the emission factors method described above.

The operational characteristics and the principal yields of the FCC unit and the amine treatment unit (AMN) are indicated in Table 1 below.

TABLE 1

(characteristics of FCC unit and of amine unit)

| | | | |
|---|---|---|---|
| FCC unit | Feed flow rate, principal elevator | 482 | t/h |
| | Outlet temperature, principal elevator | 523 | ° C. |
| | Temperature regenerator 1 | 671 | ° C. |
| | Temperature regenerator 2 | 721 | ° C. |
| | C/O ratio | 6.8 | — |
| | Dry gas yield | 3 | % by wt |
| | LPG yield | 18 | % by wt |
| | (C5-220° C.) gasoline yield | 55 | % by wt |
| | Coke yield | 7.3 | % by wt |
| Amine treatment unit | $CO_2$ entering amine unit | 141 | t/h |
| | Degree of $CO_2$ absorption in amine | 90 | % |

Table 2 below provides the utilities balance (electricity in MW and steam in t/h):
- in accordance with the prior art;
- in accordance with the present invention, in which the regenerative air blower (MAB) is driven by a counter-pressure turbine (the drive for the cracked gas compressor (WGC) being provided by an electric motor);
- in accordance with the present invention in its variation in which the cracked gas compressor (WGC) is itself driven by a counter-pressure turbine.

The "−" sign in front of a utility quantity corresponds to production of the utility, and the "+" sign signifies consumption of a utility.

TABLE 2

(Comparison of utilities balance of prior art and of invention)

| | Prior art | Invention | Invention (variation) | Units |
|---|---|---|---|---|
| Drive for air blower | Fully condensing turbine | Counter-pressure turbine | Counter-pressure turbine | — |
| Drive or cracked gas compressor | | Electric motor | | — |
| Consumption/production of electricity | | | | |
| Ex reg'n fume expander | −16.9 | −16.9 | −16.9 | MW |
| Pumps and air condensers | +3.1 | +3.5 | +3.5 | MW |
| Cracked gas compressor | 0 | +7.6 | 0 | MW |
| TOTAL ELECTRICITY | −13.8 | −5.8 | −13.4 | MW |
| Consumption/production of HP steam | | | | |
| Air blower | +100 | +211 | +211 | t/h |
| Cracked gas compressor | +31 | 0 | +65 | t/h |

TABLE 2-continued (Comparison of utilities balance of prior art and of invention)

| | Prior art | Invention | Invention (variation) | Units |
|---|---|---|---|---|
| Rec boiler + external exchanger + heat recovery in principal fractionation | −317 | −325 | −325 | t/h |
| TOTAL HP STEAM Consumption/production of LP steam | −186 | −114 | −49 | t/h |
| Amine unit | +180 | +180 | +180 | t/h |
| Air blower | 0 | −211 | −211 | t/h |
| Cracked gas compressor | 0 | 0 | −65 | t/h |
| TOTAL LP STEAM | +180 | −31 | −96 | t/h |

In the prior art, the surplus HP steam was depressurized and cooled before being used as LP steam in the amine unit.

According to Table 2, the steam balance for the prior art was almost zero (−6 t/h), while that for the invention was in substantial surplus (−145 t/h).

In order to obtain these values, the total HP and LP steam have been added together; it can be seen that the value of −145 t/h is the same in the two variations of the invention.

Table 3 below can be used to translate the utilities balance of Table 2 into a $CO_2$ balance; the "−" sign in front of a quantity of $CO_2$ corresponds to a $CO_2$ credit and the "+" sign corresponds to $CO_2$ emission.

TABLE 3

(Comparison of $CO_2$ balance in the prior art and in the invention)

| | Prior art | Invention | Invention (variation) | Units |
|---|---|---|---|---|
| $CO_2$ discharged into atmosphere (fumes at outlet from amine unit) | +14.1 | +14.1 | +14.1 | tCO2eq/h |
| $CO_2$ credit due to production of electricity (1) | −7.4 | −3.1 | −7.1 | tCO2eq/h |
| $CO_2$ credit due to production of steam (2) | 1.3 | −20.5 | −18.6 | tCO2eq/h |
| TOTAL ($CO_2$ balance) | +8.0 | −9.5 | −11.6 | tCO2eq/h |

(1) Emission factor for electricity equal to 148 gCO2eq/MJ
(2) Emission factor for steam equal to 72.1 gCO2eq/MJ The $CO_2$ discharged into the atmosphere at the outlet from the amine unit is the same in the prior art as in the invention. However, the final $CO_2$ balance for the invention (−9.5 t $CO_2$ eq/h) is lower than in the prior art process.

This is further accentuated in the preferred variation of the invention, where the $CO_2$ credit is −11.6 t $CO_2$ eq/h.

In fact, the $CO_2$ credit due to the surplus HP and LP steam was obtained by conversion of the surplus steam using a coefficient termed the emission factor for the steam.

This steam emission factor translates the GHG emissions for the production and transport of steam. The large surplus of steam in the invention is explained by selecting counter-pressure turbines as drives for the compressors of the FCC unit. It is even higher in the variation using two counter-pressure turbines.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

The entire disclosures of all applications, patents and publications, cited herein and of corresponding French application Ser. No. 11/03.999, filed Dec. 20, 2011, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

The invention claimed is:

1. An integrated process for the capture of $CO_2$, said process comprising capturing $CO_2$ emitted by fumes exiting from the regeneration zone of a catalytic cracking (FCC) unit, which unit treats a vacuum distillate or atmospheric residue type hydrocarbon cut, by subjecting said fumes to amine treatment in an amine treatment unit (AMN) to eliminate $CO_2$ therefrom, producing HP steam by cooling fumes exiting from the regeneration zone introducing said HP steam in a first counter-pressure turbine
   driving a regenerative air blower (MAB) of the FCC unit; and in
   a second counter-pressure turbine, driving a cracked gas compressor (WGC);
   and using a resulting LP steam to regenerate amine in the amine treatment unit (AMN).

2. The process according to claim 1, in which the catalytic cracking unit (FCC) operates with a downer reactor under a C/O ratio of 10 to 50 and a reactor outlet temperature of 480° C. to 650° C.

3. The process according to claim 1, comprising using the absorption unit (AMN): MEA (monoethanolamine), DEA (diethanolamine), DMEA (dimethylethanolamine), DIPA (diisopropylamine), DGA (diglycolamine), diamines, piperazine, and hydroxyethyl piperazine.

4. The process according to claim 1, comprising listing in the amine absorption unit (AMN): MEA (monoethanolamine), DEA (diethanolamine) and DMEA (dimethylethanolamine).

5. The process according to claim 1, comprising using in the amine absorption unit (AMN) MEA (monoethanolamine).

6. The process according to claim 1, comprising using in the amine absorption unit the adsorbent compound tetramethylhexane-1,6-diamine (TMHDA).

7. The process according to claim 1, in which the catalytic cracking unit (FCC) is equipped with an expansion turbine supplied with fumes deriving from the regeneration zone, said turbine converting pressure of said fumes into electricity.

8. An integrated process for the capture of $CO_2$, said process comprising capturing $CO_2$ emitted by fumes exiting from a regeneration zone of a catalytic cracking (FCC) unit, which unit treats a vacuum distillate or atmospheric residue type hydrocarbon cut, by subjecting said fumes to amine treatment in an amine treatment unit (AMN) to eliminate $CO_2$ therefrom, producing HP steam by cooling fumes exiting from the regeneration zone introducing said HP steam in a first counter-pressure turbine
   driving a regenerative air blower (MAB) of the FCC unit; and in a second counter-pressure turbine, driving a cracked gas compressor (WGC);

and using a resulting LP steam to regenerate amine in the amine treatment unit (AMN) and in which process the catalytic cracking unit (FCC) operates with a riser reactor having a C/O ratio of 2 to 20 and with a reactor outlet temperature of 450° C. to 650° C.

* * * * *